United States Patent
Kennedy et al.

(10) Patent No.: US 11,732,727 B2
(45) Date of Patent: Aug. 22, 2023

(54) VOLUMETRIC RESISTANCE BLOWERS

(71) Applicant: Intel Corporation, Santa Clara, CA (US)

(72) Inventors: David Kennedy, Portland, OR (US); Ruander Cardenas, Hillsboro, OR (US); Mark MacDonald, Beaverton, OR (US); James Raupp, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 156 days.

(21) Appl. No.: 17/473,683

(22) Filed: Sep. 13, 2021

(65) Prior Publication Data

US 2022/0010808 A1    Jan. 13, 2022

Related U.S. Application Data

(63) Continuation of application No. 16/567,762, filed on Sep. 11, 2019, now Pat. No. 11,118,598.

(60) Provisional application No. 62/737,278, filed on Sep. 27, 2018.

(51) Int. Cl.
| | |
|---|---|
| *H05K 7/20* | (2006.01) |
| *F28F 13/10* | (2006.01) |
| *F04D 29/28* | (2006.01) |
| *F04D 29/02* | (2006.01) |
| *G06F 1/20* | (2006.01) |

(52) U.S. Cl.
CPC ......... *F04D 29/281* (2013.01); *F04D 29/023* (2013.01); *G06F 1/20* (2013.01); *G06F 1/203* (2013.01); *G06F 2200/201* (2013.01); *G06F 2200/202* (2013.01)

(58) Field of Classification Search
CPC .. F04D 29/281; F04D 25/0613; F04D 17/167; F04D 25/08; F04D 19/002; F04D 25/064; F04D 29/329; F04D 29/20; F04D 29/023; G06F 1/20; G06F 1/203; G06F 2200/201; G06F 2200/202; H05K 7/20
See application file for complete search history.

(56) References Cited

U.S. PATENT DOCUMENTS

| | | |
|---|---|---|
| 579,081 A | 3/1897 | Rembert |
| 2,831,630 A | 4/1958 | Perry |
| 2,841,289 A | 7/1958 | Odium et al. |

(Continued)

FOREIGN PATENT DOCUMENTS

| | | |
|---|---|---|
| DE | 2525865 A1 | 1/1976 |
| DE | 102005044471 A1 | 3/2003 |

(Continued)

OTHER PUBLICATIONS

European Patent Office, "Communication under Rule 71(3) EPC," issued in connection with European Patent Application No. 19193582.4-1004, dated Aug. 12, 2022 (43 pages).

(Continued)

*Primary Examiner* — Michael A Matey
(74) *Attorney, Agent, or Firm* — Hanley, Flight & Zimmerman, LLC

(57) ABSTRACT

Volumetric resistance blowers are disclosed herein. An example volumetric resistance blower includes a housing, a motor, and a rotor disposed within the housing and rotated by the motor. The rotor is constructed of metal foam.

20 Claims, 11 Drawing Sheets

(56) References Cited

U.S. PATENT DOCUMENTS

| | | | |
|---|---|---|---|
| 3,414,188 | A | 12/1968 | Gallie |
| 4,563,126 | A | 1/1986 | Kobayashi et al. |
| 4,902,196 | A | 2/1990 | Byrd |
| 5,257,902 | A | 11/1993 | Atarashi et al. |
| 5,265,348 | A | 11/1993 | Fleishman et al. |
| 5,297,942 | A | 3/1994 | Fleishman et al. |
| 5,689,404 | A | 11/1997 | Katsui |
| 5,694,294 | A | 12/1997 | Ohashi et al. |
| 5,934,368 | A | 8/1999 | Tanaka et al. |
| 5,949,646 | A | 9/1999 | Lee et al. |
| 6,011,689 | A | 1/2000 | Wrycraft |
| 6,141,214 | A | 10/2000 | Ahn |
| 6,179,046 | B1* | 1/2001 | Hwang ............... H01L 23/467 257/E23.099 |
| 6,452,797 | B1 | 9/2002 | Konstad |
| 6,496,366 | B1 | 12/2002 | Coglitore et al. |
| 6,519,149 | B1 | 2/2003 | Inoue |
| 6,671,177 | B1 | 12/2003 | Han |
| 6,681,845 | B1 | 1/2004 | Yeh et al. |
| 6,914,782 | B2 | 7/2005 | Ku |
| 6,924,978 | B2 | 8/2005 | DiStefano |
| 7,086,837 | B2 | 8/2006 | Kamoshita et al. |
| 7,248,471 | B2 | 7/2007 | Wabiszczewicz |
| 7,273,089 | B2 | 9/2007 | Hata et al. |
| 7,298,615 | B2 | 11/2007 | Wong |
| 7,317,614 | B2 | 1/2008 | Ruch et al. |
| 7,348,743 | B1 | 3/2008 | Corbett et al. |
| 7,455,504 | B2* | 11/2008 | Hill .................. F04D 17/167 416/179 |
| 7,630,201 | B2 | 12/2009 | Asahi |
| 7,697,290 | B2 | 4/2010 | Wu |
| 7,764,493 | B2 | 7/2010 | Ali et al. |
| 7,872,864 | B2 | 1/2011 | Mongia et al. |
| 7,898,805 | B2 | 3/2011 | MacDonald |
| 8,075,276 | B2 | 12/2011 | Hwang et al. |
| 8,175,757 | B2 | 5/2012 | Aggus et al. |
| 8,190,276 | B2 | 5/2012 | Lewis et al. |
| 9,551,352 | B2 | 1/2017 | MacDonald et al. |
| 9,639,125 | B2 | 5/2017 | Delano et al. |
| 9,746,001 | B2 | 8/2017 | MacDonald |
| 10,185,351 | B2 | 1/2019 | Yin et al. |
| 10,511,204 | B2* | 12/2019 | Chang ............... H02K 21/22 |
| 10,545,546 | B2 | 1/2020 | Varadarajan et al. |
| 2002/0180285 | A1* | 12/2002 | Machiroutu ......... F04D 17/127 310/67 R |
| 2003/0161102 | A1 | 8/2003 | Lee et al. |
| 2004/0125558 | A1 | 7/2004 | DiStefano |
| 2004/0184914 | A1 | 9/2004 | Doege et al. |
| 2005/0122682 | A1 | 6/2005 | Streit et al. |
| 2008/0247134 | A1 | 10/2008 | Hwang et al. |
| 2009/0000774 | A1 | 1/2009 | MacDonald et al. |
| 2009/0120454 | A1 | 5/2009 | Ochs et al. |
| 2010/0172095 | A1 | 7/2010 | MacDonald et al. |
| 2011/0063795 | A1 | 3/2011 | Yeh et al. |
| 2011/0159797 | A1 | 6/2011 | Beltman et al. |
| 2012/0026677 | A1 | 2/2012 | Bhutani et al. |
| 2013/0286581 | A1* | 10/2013 | MacDonald ............. G06F 1/20 361/679.48 |
| 2014/0069432 | A1 | 3/2014 | Mebasser et al. |
| 2015/0003007 | A1* | 1/2015 | MacDonald ........ F04D 25/0613 415/217.1 |
| 2016/0010655 | A1* | 1/2016 | Wu .................. F04D 25/0613 415/206 |
| 2018/0328376 | A1* | 11/2018 | Ishii ..................... F04D 29/281 |
| 2019/0041924 | A1 | 2/2019 | Varadarajan et al. |

FOREIGN PATENT DOCUMENTS

| | | |
|---|---|---|
| GB | 1501473 A | 2/1978 |
| JP | S61048999 U | 4/1986 |
| JP | H1054388 A | 2/1998 |
| JP | 2001041196 A | 2/2001 |
| JP | 2001082396 A | 3/2001 |
| JP | 2003218568 A | 7/2003 |
| JP | 2005290987 A | 10/2005 |
| JP | 2006207519 A | 8/2006 |
| JP | 2006299949 A | 11/2006 |
| TW | 200813338 A | 3/2008 |
| TW | 201312010 A | 3/2013 |
| WO | 2010042077 A1 | 4/2010 |
| WO | 2013085510 A1 | 6/2013 |
| WO | 2017090347 A1 | 6/2017 |

OTHER PUBLICATIONS

English Translation DE-102005044471-A1 (Year: 2006).

European Patent Office, "Extended European Search Report", issued in connection with application No. 19193582.4 dated Feb. 26, 2020, 7 pages.

International Searching Authority, "International Search Report and Written Opinion," Issued in connection with International Patent Application No. PCT/US2014/043786, dated Oct. 17, 2014, 9 pages.

International Searching Authority, "International Search Report and Written Opinion," issued in connection with International Patent Application No. PCT/US2011/063828, dated Jul. 24, 2012, 9 pages.

Taiwan Patent Office, "Office Action and Search Report," issued in connection with Taiwanese Patent Application No. 103119371, dated Nov. 17, 2015, 17 pages.

The State Intelluactual Property Office of China, "First Office Action", issued in connection with Chinese patent application No. 201180075352.8, dated Sep. 27, 2016, 29 pages.

Japan Patent Office, "Notice of Reasons for Rejection," issued in connection with Japanese Patent Application No. 2014-545865, dated Apr. 28, 2015, 2 pages.

Korean Patent Office, "Notice of Preliminary Rejection," issued in connection with Korean Patent Application No. 2014-7015162, dated Feb. 3, 2016, 10 pages.

United States Patent and Trademark Office, "Non-Final Office Action," issued in connection with U.S. Appl. No. 16/567,762, dated Jan. 26, 2021, 17 pages.

United States Patent and Trademark Office, "Notice of Allowance and Fee(s) Due," issued in connection with U.S. Appl. No. 16/567,762, dated May 7, 2021, 9 pages.

European Patent Office, "Intention to Grant", issued in connection with application No. 19193582.4 dated Feb. 22, 2022, 43 pages.

* cited by examiner

VOLUMETRIC RESISTANCE BLOWERS

RELATED APPLICATIONS

This patent arises from a continuation of U.S. application Ser. No. 16/567,762 (now U.S. Pat. No. 11,118,598), titled "Volumetric Resistance Blowers," filed Sep. 11, 2019, which claims the benefit under 35 U.S.C. § 119(e) to U.S. Provisional Application No. 62/737,278, titled "Volumetric Resistance Blowers," filed Sep. 27, 2018, both which are hereby incorporated by this reference in their entireties.

FIELD OF THE DISCLOSURE

This disclosure relates generally to blowers and, more particularly, to volumetric resistance blowers.

BACKGROUND

Fans or blowers are commonly used in computing devices (e.g., laptop computers) to dissipate heat generated by parts of the computing device. These known fans or blowers include a plurality of fan blades or fins that are driven by a motor to produce air flow.

Figure 1:
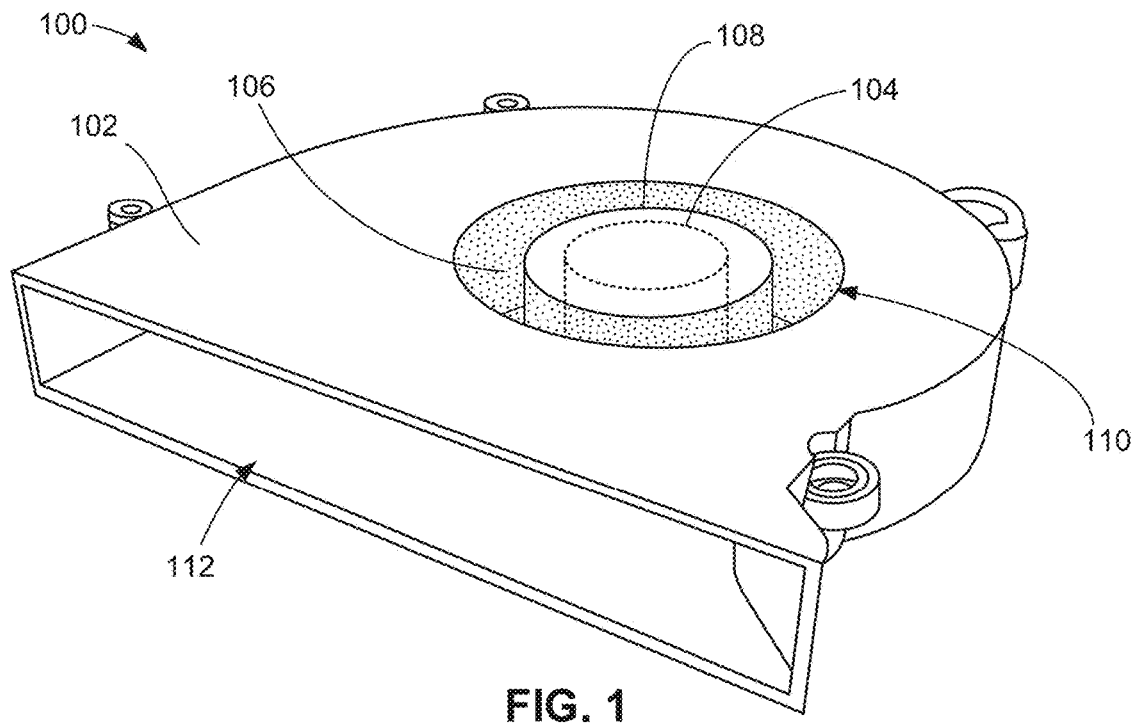
FIG. 1 illustrates an example volumetric resistance blower in which examples disclosed herein may be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Computing devices often include components that generate heat, such as processors, hard drives, etc. This heat negatively affects performance of those components as well as other nearby components and, thus, negatively impacts the performance of the computing device. Fans or blowers are commonly used in computing devices or systems to dissipate this heat. A fan or blower generates an air flow that removes or dissipates the heat. Known fans or blowers include rotors having a plurality of discrete rotor blades or fins. However, these blade-based rotors generate an undesirable amount of noise, which results in an unsatisfactory experience for the user (e.g., a person using a laptop computer). Many computing device manufacturers have acoustic limits or other restrictions on the amount of noise allowed. Therefore, many fans or blowers are often operated at lower speeds to reduce noise, but this results in reduced efficiency for the blower and reduced cooling capacity for the overall system.

In recent years, blade-based rotors have been replaced with cylindrical or disc-shaped foam rotors. These known foam rotors are constructed of a block of relatively soft or spongy foam material such as polyurethane-based material. Replacing a traditional blade-based rotor with a cylindrical foam rotor reduces blower acoustic levels and improves cooling capabilities. The foam rotor is coupled directly to a hub of the motor with an adhesive. The motor spins the foam rotor. The centrifugal forces generated by the spinning foam rotor forces air outward through the outer peripheral edge of the rotor.

Disclosed herein are improvements to volumetric resistance blowers that utilize cylindrical or disc-shaped rotors constructed of foam blocks. Disclosed herein are example carrier plates that may be used to couple a foam rotor to a motor of a volumetric resistance blower. An example volumetric resistance blower disclosed herein includes a motor that drives a rotatable hub. An example carrier plate is coupled to and rotates with the hub. A foam rotor is coupled to a side of the carrier. Therefore, rather than coupling the foam rotor directly to the hub with an adhesive, which deteriorates over time, the carrier plate supports the foam rotor and couples the foam rotor to the hub. Further, by supporting the foam rotor along a side of the foam rotor, the carrier plate prevents the foam rotor from shredding or tearing over time, thereby increasing the life of the foam rotor and performance of the volumetric resistance blower. By reducing or eliminating shredding or tearing, the carrier plate also enables the use of rotors constructed of less expensive (e.g., weaker) foam materials that may otherwise quickly shred or tear if used without the carrier plate.

Also disclosed herein are foam rotors constructed of a metal foam material, such as nickel foam. Metal foam materials, as compared to softer foam materials like polyurethane, are relatively rigid and have high structural integrity. Metal foam rotors are less likely to tear or shred and, thus, improve performance of the volumetric resistance blower.

Also disclosed herein are foam rotors having specifically design and oriented cellular structures and features, as opposed to the random, amorphous cell structure of common foams, which improves radial air flow (i.e., air flow in the radial direction) through the rotor. Employing a purposely designed and oriented cellular structure and features that reduce radial air flow impedance relative to the angular direction results in increased air flow and improved cooling performance at ISO acoustic levels. Some example foam rotors disclosed herein have varying degrees of porosity to achieve certain flow characteristics.

For example, an example foam rotor disclosed herein is constructed of a plurality of sections of foam materials having differing degrees of porosity. In some examples, the sections are arranged as concentric rings. The inner diameter section may have a lower porosity, whereas the outer diameter section may have a higher porosity. This arrangement enables more air flow closer to the center of the rotor, where the radial speed of the rotor is less and the air is flowing more slowly, while the denser porosity at the outer diameter ensures the air flow is directed more radially. This results in a smoother, quieter air flow through the rotor.

FIG. 1 illustrates an example volumetric resistance blower (VRB) 100 in which examples disclosed herein may be implemented. In the illustrated example, the VRB 100 includes a housing 102 (which may be referred to as a casing), a motor 104 (shown in dotted lines), and a rotor 106. The motor 104 and the rotor 106 are disposed within the housing 102. The rotor 106 is coupled to and driven by the motor 104 to produce air flow. In this example, the rotor 106 is coupled to a hub 108 that is coupled to and driven by the motor 104. In the illustrated example, the motor 104 is disposed within the hub 108 (e.g., to reduce space). The motor 104 rotates the rotor 106 (via the hub 108) within the housing 102 to move air from an inlet 110 formed in the housing 102 to an outlet 112 formed in the housing 102. In particular, when the rotor 106 is rotated, the rotor 106 draws air into the housing 102 through the inlet 110 and moves the air outward through the outlet 112.

Figure 2:
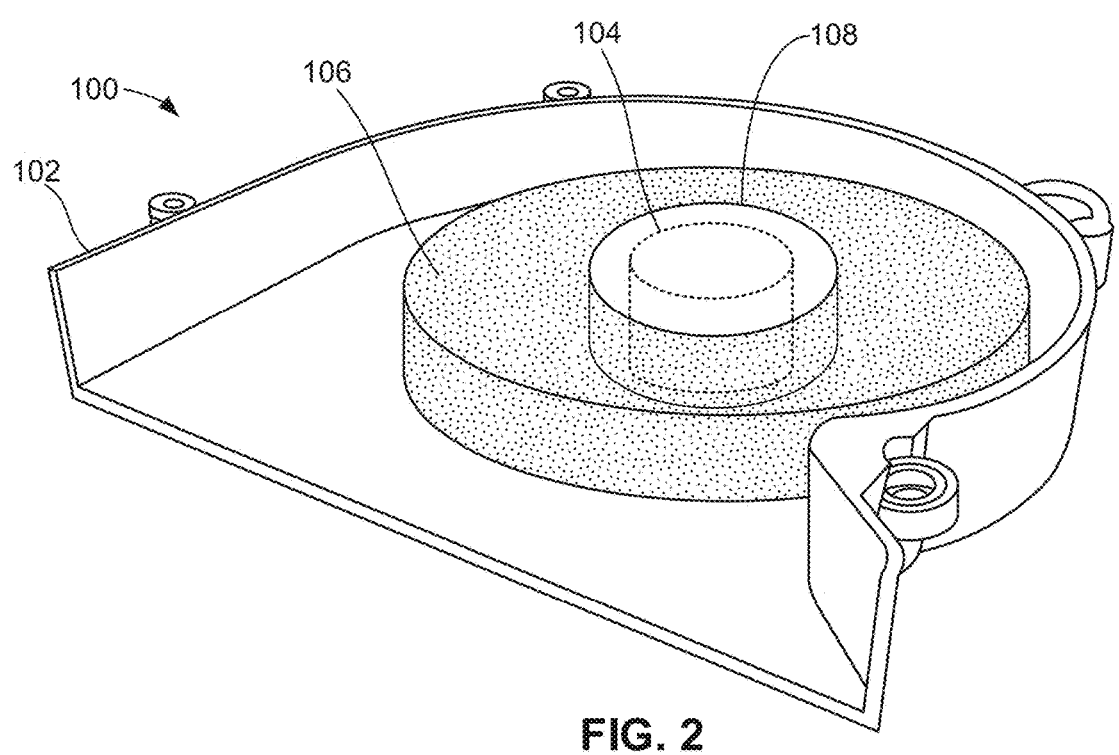
FIG. 2 illustrates the example volumetric resistance blower of FIG. 1 with a top portion of a housing removed to expose the internal component(s) of the example volumetric resistance blower.

FIG. 2 shows the example VRB 100 with a top portion of the housing 102 removed to expose the motor 104, the rotor 106, and the hub 108. In this example, the rotor 106 is a substantially sold block or piece of foam in the shape of a cylinder or disc. The rotor 106 may be constructed of a single block of foam material or multiple blocks of foam material coupled together to form the cylinder or disc. In other examples, the rotor 106 may be shaped and/or sized differently. The rotor 106 is constructed of an open-cell-structure foam material. In an open-cell-structured foam material, the cells (sometimes referred to as pores, voids or cavities) in the foam material are interconnected and a form a network of channels. The foam material may be, for example, reticulated foam, polyurethane foam, open cell rubber, and/or any other suitable type of foam material. When the rotor 106 is rotated, centrifugal force causes the air in the cells to be move radially outward from the rotor 106. Therefore, air is drawn into an inner diameter portion of the rotor 106, passes through the rotor 106, and is ejected from an outer peripheral edge of the rotor 106. As compared to traditional blade-based rotors, the example foam block rotor 106 generates significantly less noise, which is often desirable when utilized in a consumer device.

Figure 3:
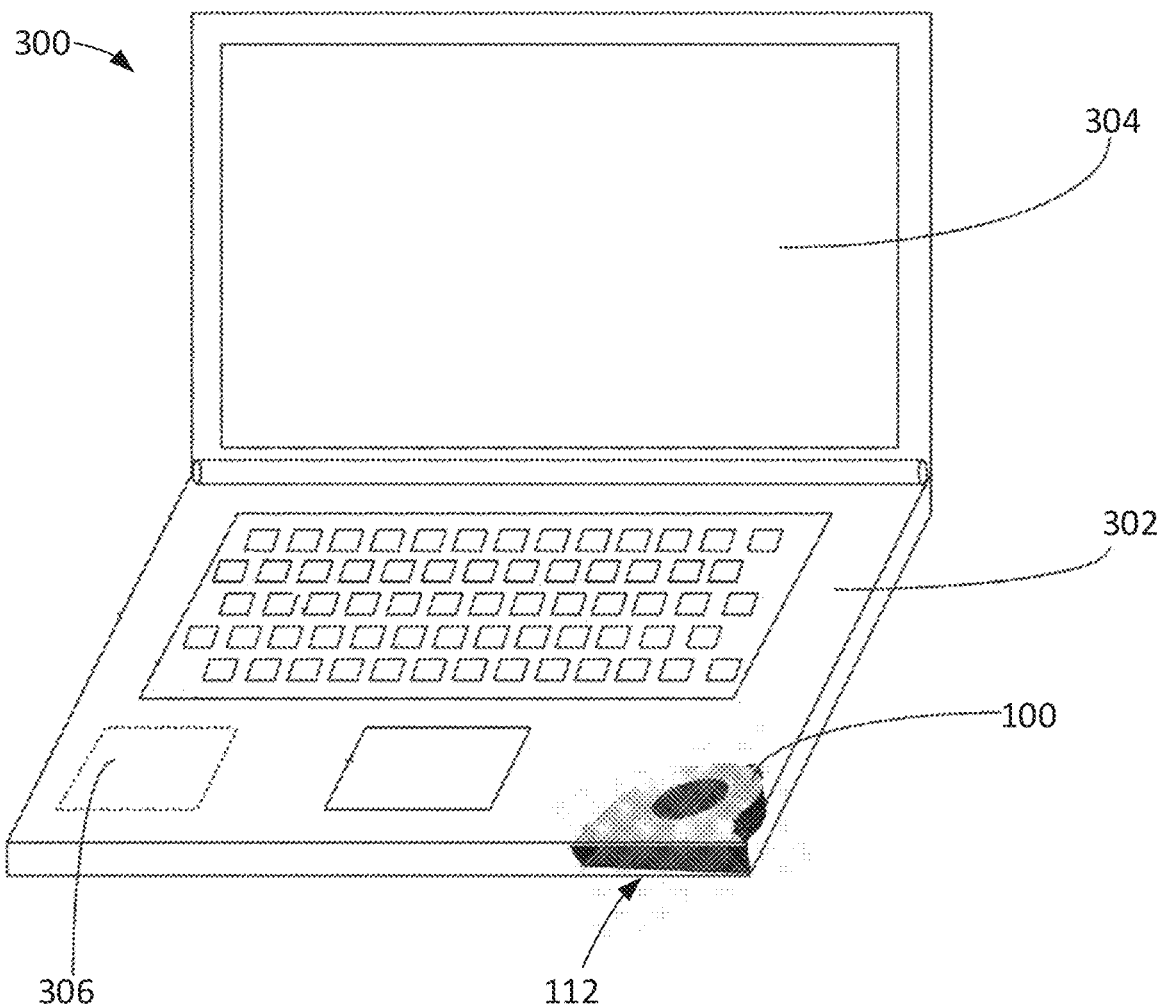
FIG. 3 illustrates an example computing device that may employ the example volumetric resistance blower of FIG. 1.

The example VRB 100 may be utilized to cool a computing device or system of devices. For example, FIG. 3 shows an example laptop computer 300 that employs the example VRB 100 to dissipate heat. The laptop computer 300 includes an enclosure 302, a display 304, and one or more heat generating devices 306 disposed within the enclosure 302. The one or more heat generating devices 306 may include, for example, one or more processors (e.g., a central processing unit (CPU), a graphics processing unit (GPU), etc.), one or more storage devices, and/or other circuitry. In the illustrated example, the VRB 100 is at least partially disposed within the enclosure 302 of the laptop computer 300. In this example, the outlet 112 of the VRB 100 is directed outward from the enclosure 302. The VRB 100 draws warm air from inside the enclosure 302 and ejects the air outward from the enclosure 302, thereby decreasing the temperature inside of the enclosure 302. In other examples, the VRB 100 can be positioned to blow air into the enclosure 302 and across the heat generating devices 306. In some examples, multiple ones of the VRB 100 may be utilized in the laptop computer 300. While in this example the VRB 100 is shown in connection with a laptop computer, it is to be understood that the VRB 100 can likewise be implemented in connection with any other type of computing device or system of devices, such as a desktop computer, a tablet computer, a multimedia player, a server, a smart phone, etc.

As described above in connection with the design of FIG. 1, the rotor 106 is coupled directly to the hub 108. In some instances, the rotor 106 is coupled to the hub 108 via an adhesive (e.g., glue). However, adhesives may deteriorate over time, which results in the rotor 106 separating from the hub 108. Further, many manufacturers have restrictions about the use of adhesives in parts of a computing device. Also, by only connecting the rotor 106 at the inner peripheral edge, the foam material tends to tear or shred over time due to centrifugal forces acting on the foam.

Figure 4A:
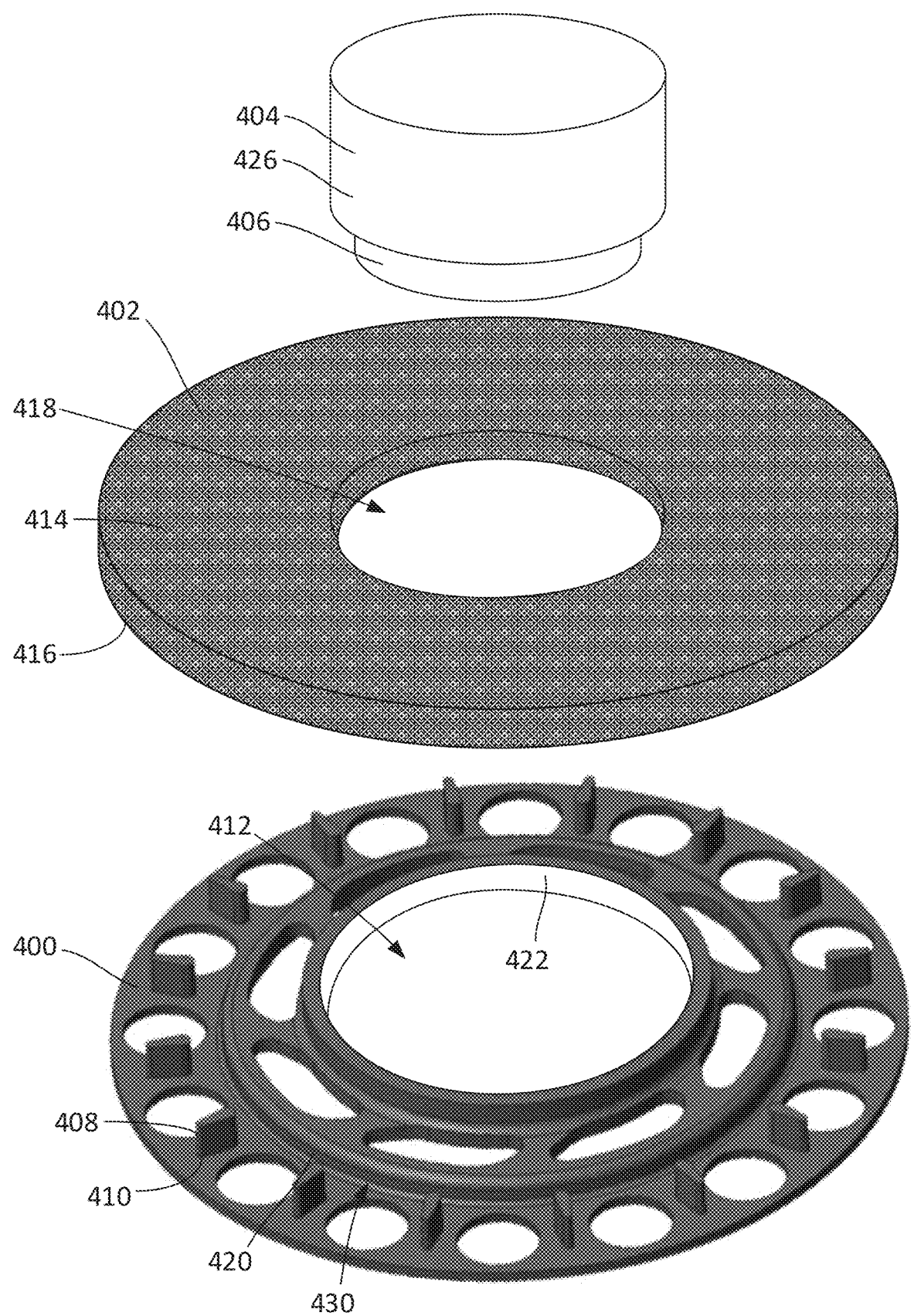
FIG. 4A illustrates an example carrier plate that may be implemented in connection with the example volumetric resistance blower of FIG. 1 to couple an example rotor to an example motor.

FIG. 4A illustrates an example carrier plate 400 that may be used to couple a foam rotor 402 to a hub 404 of a motor 406. The carrier plate 400, the foam rotor 402, the hub 404, and the motor 406 can be implemented in the VRB 100 of FIG. 1 (e.g., in place of the motor 104, the rotor 106, and the hub 108). The carrier plate 400 has a first side 408 (e.g., a top side) and a second side 410 (e.g., a bottom side) opposite the first side 408. In the illustrated example, the carrier plate 400 includes an opening 412 (which may be referred to as a central opening) that extends between the first and second sides 408, 410. The rotor 402 includes a first side 414 (e.g., a top side), a second side 416 (e.g., a bottom side) opposite the first side 414, and an opening 418 (which may be referred to as a central opening) extending between the first and second sides 414, 416. When assembled, the motor 406 and the hub 404 are disposed within the openings 412, 418. In particular, the motor 104 extends through the openings 412, 418 and is coupled to the housing 102 (FIGS. 1 and 2). Further, the rotor 402 is disposed on the first side 408 of the carrier plate 400, and the carrier plate 400 is coupled to the hub 404. The motor 406 drives (rotates) the carrier plate 400 (via the hub 404), which rotates the rotor 106. Therefore, the carrier plate 400 supports the rotor 402 and couples the rotor 402 to the motor 406.

Similar to the rotor 106 of FIG. 1, the rotor 402 may be constructed of a single block or piece of open-cell foam material or multiple blocks of open-cell foam material coupled together to form the cylinder or disc-shape. The carrier plate 400 may be constructed of a relatively rigid material, such as plastic. In other examples, the carrier plate 400 can be constructed of another material. In the illustrated example, the carrier plate 400 is circular to match the shape of the rotor 402. In some examples, the carrier plate 400 has the same diameter as the rotor 402. In other examples, the carrier plate 400 may have a larger or smaller diameter than the rotor 402. In other examples, the carrier plate 400 and/or the rotor 402 may be sized and/or shaped differently.

Figure 5:
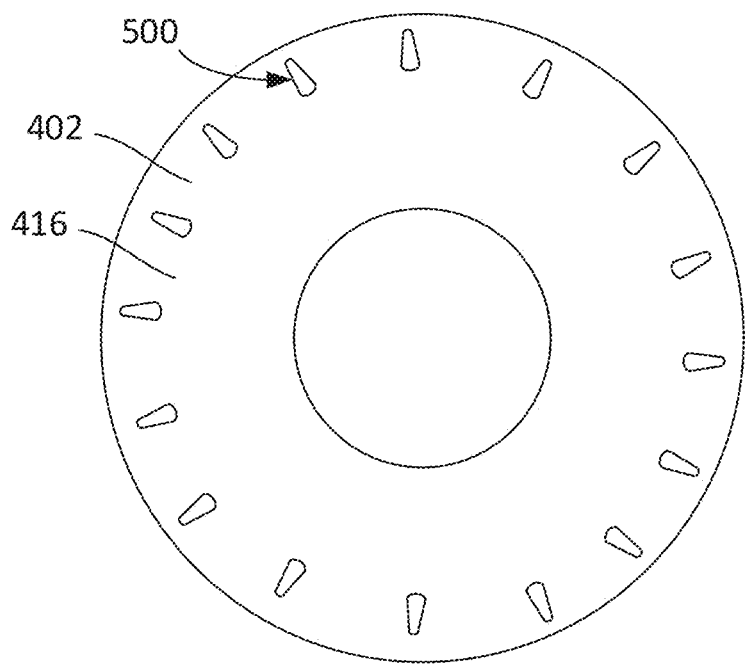
FIG. 5 is a bottom side view of an example rotor that may be coupled to the example carrier plate of FIGS. 4A and 4B.

To couple the rotor 402 to the carrier plate 400, the carrier plate 400 in this example includes a plurality of posts 420 (one of which is referenced in FIG. 4A) extending from the first side 408. Referring briefly to FIG. 5, the second side 416 of the rotor 402 includes a plurality of openings 500 (one of which is referenced in FIG. 5) matching the locations of the posts 420. The openings 500 may be formed via laser cutting, for example. In some examples, the openings 500 extend partially into the rotor 402 (e.g., a distance corresponding to the height of the posts 420). In other examples, the openings 500 extend completely through the rotor 402. When the rotor 402 is disposed on the first side 408 of the carrier plate 400, the posts 420 extend into corresponding ones of the openings 500 formed in the rotor 402 to couple the rotor 402 to the carrier plate 400. In some examples, the openings 500 are smaller than the posts 420, which results in the foam material expanding onto and engaging the posts 420, thereby creating friction to hold the rotor 402 on the carrier plate 400. By using the carrier plate 400, adhesives can be eliminated. In other words, the rotor 402 does not need to be coupled directly to the hub 404 via an adhesive. Therefore, in some examples, no adhesives are used to couple the rotor 402 (directly or indirectly) to the motor 406 or the hub 404. The carrier plate 400 also supports the rotor 402 along the second side 416, which eliminates or reduces tearing and shredding that can occur when only attaching the inner peripheral edge of the rotor 402 to the hub 404. Further, the example carrier plate 400 improves manufacturability. In particular, in some examples, it is easier to attach the rotor 402 to the hub 404 via the carrier plate 400 rather than attaching the rotor 402 directly to the hub 404 via an adhesive.

In the illustrated example, the carrier plate 400 includes sixteen (16) posts 420. However, in other examples the carrier plate 400 may include more (e.g., 17, 18, etc.) or fewer (e.g., 15, 14, . . . , 2, 1) post(s). In the illustrated example, the posts 420 are spaced equidistant from each other around the carrier plate 400. In other examples, the posts 420 may be spaced differently. In the illustrated example, the posts 420 have a tear-drop shaped cross-section. In other examples, one or more of the posts 420 may have a different cross-sectional shape (e.g., circular, square, rectangular, triangular, etc.). Further, while in the illustrated example of FIG. 5 the openings 500 are shaped to match the cross-sectional shape of the posts 420, in other examples, the openings 500 may be shaped differently. For example, the openings 500 may instead be slits or small elongated openings.

In some examples, the carrier plate 400 and the hub 404 are co-molded and form a substantially unitary part or component. For example, an inner peripheral edge 422 of the carrier plate 400 may be co-molded with an outer surface 426 of the hub 404. In other examples, the carrier plate 400 may be a separate part or component that is coupled to the hub 404. For example, the carrier plate 400 may be coupled to the hub 404 via press fit (e.g., friction fit or interference fit). For example, a diameter of the opening 418 in the carrier plate 400 defined by the inner peripheral edge 422 may be slightly smaller than an outer diameter of the hub 404. Once the hub 404 is inserted through the opening 418, the friction between the outer surface 426 of the hub 404 and the inner peripheral edge 422 holds the carrier plate 400 on the hub 404. In another example, the inner peripheral edge 422 of the carrier plate 400 may include a keyed profile (e.g., splines) that mate with a corresponding keyed profiled on the outer surface 426 of the hub 404. In other examples, the carrier plate 400 can be coupled to the hub 404 via other mechanical and/or chemical fastening techniques (e.g., welding (e.g., ultrasonic welding), one or more fasteners (e.g., a screw), an adhesive, etc.).

In the illustrated example of FIG. 4A, the carrier plate 400 includes a plurality of openings 430 (one of which is referenced in FIG. 4A) to increase air flow. The openings 430 also reduce the overall weight of the carrier plate 400. In other examples more or fewer openings may be provided in the carrier plate 400 and/or the opening(s) 430 may be shaped differently.

Figure 4B:
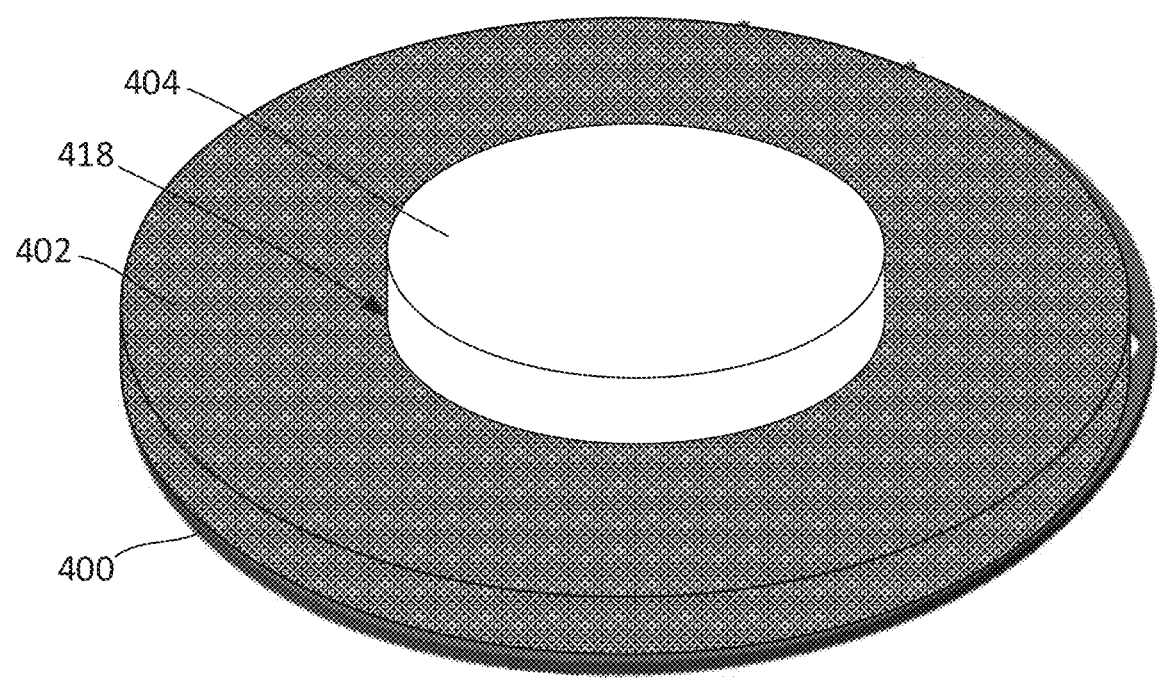
FIG. 4B is an assembled view of the example carrier, the example rotor, and the example rotor of FIG. 4A.

FIG. 4B is an assembled view of the carrier plate 400, the rotor 402, and the motor 406 (FIG. 4A) with the hub 404). The rotor 402 is disposed on the first side 408 of the carrier plate 400. The carrier plate 400 is coupled to the hub 404. The hub 404 (and the motor 406 (FIG. 4A) extend upward through the opening 418 in the rotor 402.

Figure 6:
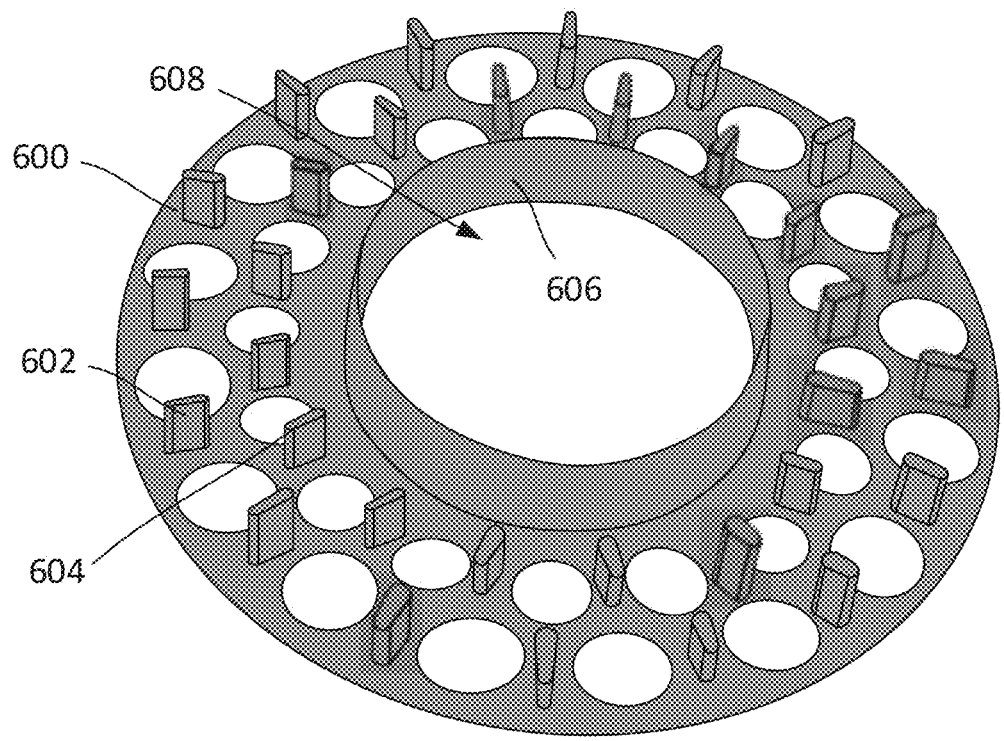
FIG. 6 illustrates another example carrier plate that may be implemented in connection with the example volumetric resistance blower of FIG. 1 to couple an example rotor to an example motor.

FIG. 6 illustrates another example carrier plate 600 that may be used to couple a foam rotor to a hub of a motor (e.g., to the hub 108 or the hub 404). In this example, the carrier plate 600 includes a first set of posts 602 (one of which is referenced in FIG. 6) spaced around a center of the carrier plate 600 and a second set of posts 604 (one of which is referenced in FIG. 6) spaced around the center of the carrier plate 600. In the illustrated example, the first set of posts 602 are spaced further from the center of the carrier plate 600 than the set plurality of posts 604. Similar to the example disclosed above in connection with FIGS. 4A, 4B, and 5, a foam rotor may be disposed on the carrier plate 600. Openings (e.g., slits) can be formed in a bottom side of the rotor to receive the first and second sets of posts 602, 604.

Similar to the carrier plate 400 disclosed above, the carrier plate 600 may be coupled to a hub of a motor via press fit (e.g., friction fit or interference fit). For example, a diameter of an opening 608 in the carrier plate 600 defined by an inner peripheral edge 606 may be slightly smaller than an outer diameter of the hub. Once the hub is inserted through the opening 608, the friction between the hub and the inner peripheral edge 606 holds the carrier plate 600 on the hub. In other examples, the carrier plate 600 may be co-molded with the hub. In still other examples, the inner peripheral edge 606 may include a keyed profile to mate with a corresponding keyed profile on a motor and/or hub. In other examples, the carrier plate 600 can be coupled to a motor and/or a hub via other mechanical and/or chemical fastening techniques (e.g., welding, one or more screws, etc.).

Figure 7:
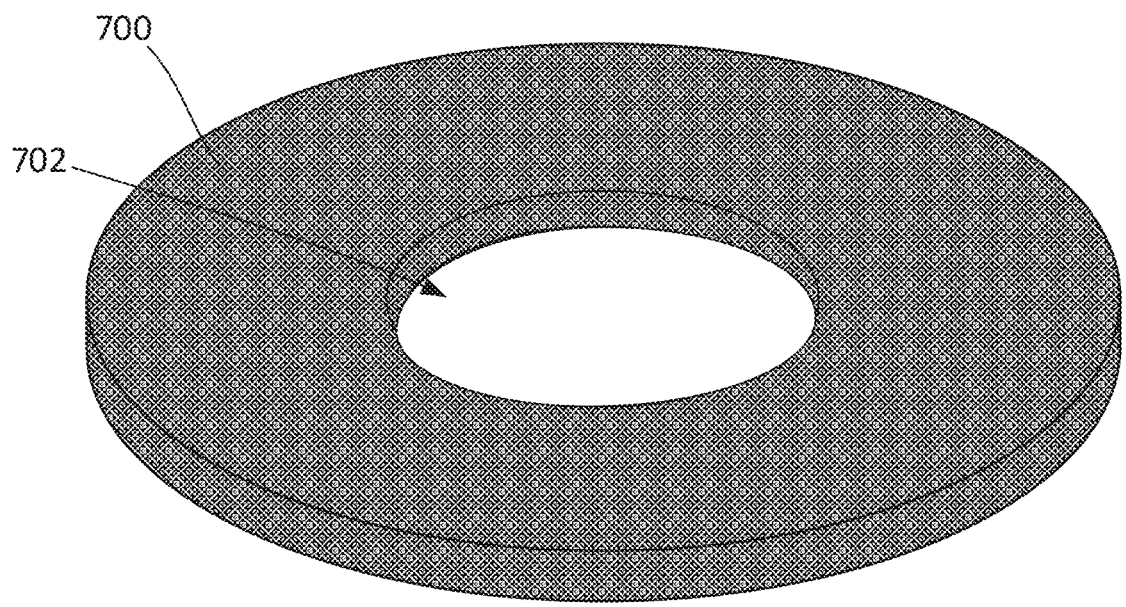
FIG. 7 illustrates an example rotor constructed of a metal foam material that may be implemented in connection with the volumetric resistance blower of FIG. 1.

In some examples, a rotor for a VRB may be constructed of a metal foam. For example, FIG. 7 illustrates an example rotor 700 constructed of nickel foam. In other examples, the rotor 700 can be constructed of another type of metal foam material, such as a copper foam, an aluminum foam, steel wool, and/or a carbon foam. In other examples, other types of foams may be used, such as coated plastic foams. The rotor 700 can be constructed of a single block of metal form or multiple blocks of metal foam. The example rotor 700 can be implemented in the VRB 100 of FIG. 1. For example, the rotor 700 can be used in place of the rotor 106. In the illustrated example, the rotor 700 includes an opening 702 to receive the motor 104 and the hub 108. In the illustrated example, the rotor 700 is cylindrical or disc-shaped. In other examples, the rotor 700 may have a different shape and/or size.

Nickel foam is relatively rigid compared to softer foams such as polyurethane-based foams. Thus, nickel foam offers excellent structural integrity, which reduces or eliminates tearing and/or deterioration that may occur in softer foam rotors. Further, using a stronger material, such as nickel foam, enables the use of a thinner rotor. For example, the rotor 700 can be less than 1 millimeter thick. As such, the overall volume of the VRB 100 can be reduced. Also, the rotor 700 can be used in thinner blowers where thicker, softer foam rotors may not be able to fit. Further, the use of a thinner rotor reduces the weight of the rotor 700 and, thus, the overall weight of the VRB 100. The nickel foam can be partially and/or locally compressed to allow for more flexibility while allowing for tighter tolerances and improved performance (e.g., improved pressure-flow performance). The nickel foam material of the rotor 700 can have any degree of porosity. In some examples, the nickel foam can have varied porosities, such as disclosed in further detail herein in connection with the foam materials in FIGS. 10-12.

Figure 8:
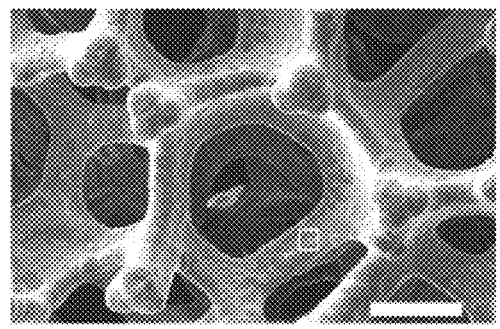
FIG. 8 is an enlarged view of the example metal foam material of FIG. 7.

FIG. 8 is an example scanning electron microscope (SEM) image of a nickel foam material. Similar to the softer foams disclosed herein (e.g., a polyurethane foam), the nickel foam has an open-cell-structure including cells that are interconnected to form a network of channels. Similar to the rotor 106 disclosed above, when the rotor 700 is rotated, the centrifugal force pushes air through the channels from an inner diameter portion toward an outer diameter portion of the rotor 700.

Figure 9:
FIG. 9 illustrates an example roll of metal foam material from which the example rotor of FIG. 7 may be cut.

The rotor 700 of nickel foam material can be constructed or manufactured in a variety of manners. For example, the rotor 700 can be cut (e.g., via a die, via laser cutting, etc.) from a stock of nickel foam material, such as a roll of nickel foam material 900 shown in FIG. 9. Additionally or alternatively, the rotor 700 can be constructed using an additive manufacturing process (e.g., a 3D printer).

The rotor 700 can be coupled to the hub 108 in a variety of manners. In some examples, the rotor 700 is coupled to the hub 108 via press fit (e.g., friction fit or interference fit). For example, the inner diameter of the opening 702 may be slightly smaller than an outer diameter of the hub 108. Once the hub 108 is inserted through the opening 702, the friction between the hub 108 and the opening 702 holds the rotor 700 on the hub 108. In other examples, because the rotor 700 is constructed of a metal, the rotor 700 can be soldered or welded to the hub 108. As another example, the rotor 700 may include a keyed profile that matches a corresponding keyed profile on the hub 108. As another example, the rotor 700 can be coupled to the hub 108 via an adhesive.

Also disclosed herein are rotors constructed of foam material that is specifically designed to achieve varying air-flow impedance at different locations and along different directions of the foam. For example, specifically designed arrangements of varying porosity can be used to optimize flow through a rotor. In some examples, the porosity changes in the radial direction through the foam rotor. For example, a foam rotor can be constructed with lower porosity at or near the center and higher porosity at or near the periphery. Additionally or alternatively, the foam rotor may have a porosity that changes in the axial direction (e.g., from a higher porosity in the middle to a lower porosity at the top and bottom, from a lower porosity in the middle to a higher porosity at the top and bottom, from a lower porosity at the bottom to a higher porosity at the top, from a higher porosity at the bottom to a lower porosity at the top). Porosity may be determined by pores-per-inch (PPI), for example. Higher porosity means more pores, which results in the material being more closed and, thus, requires more pressure to push or pull air through the material. Lower porosity, on the other hand, means less pores, which results in the material being more open and, thus, less pressure to push or pull air through the material. Also, foams that have different resistances in different directions may be utilized. These specific matrixes and structures can be achieved by stretching and/or spinning during casting operations, for example. In general, recirculation of air within a rotor results in greater power demands of a motor. Therefore, optimizing the cellular network or matrix of the foam to achieve increased flow in the radial direction can greatly reduce motor power demands and significantly increase air flow efficiency.

Figure 10:
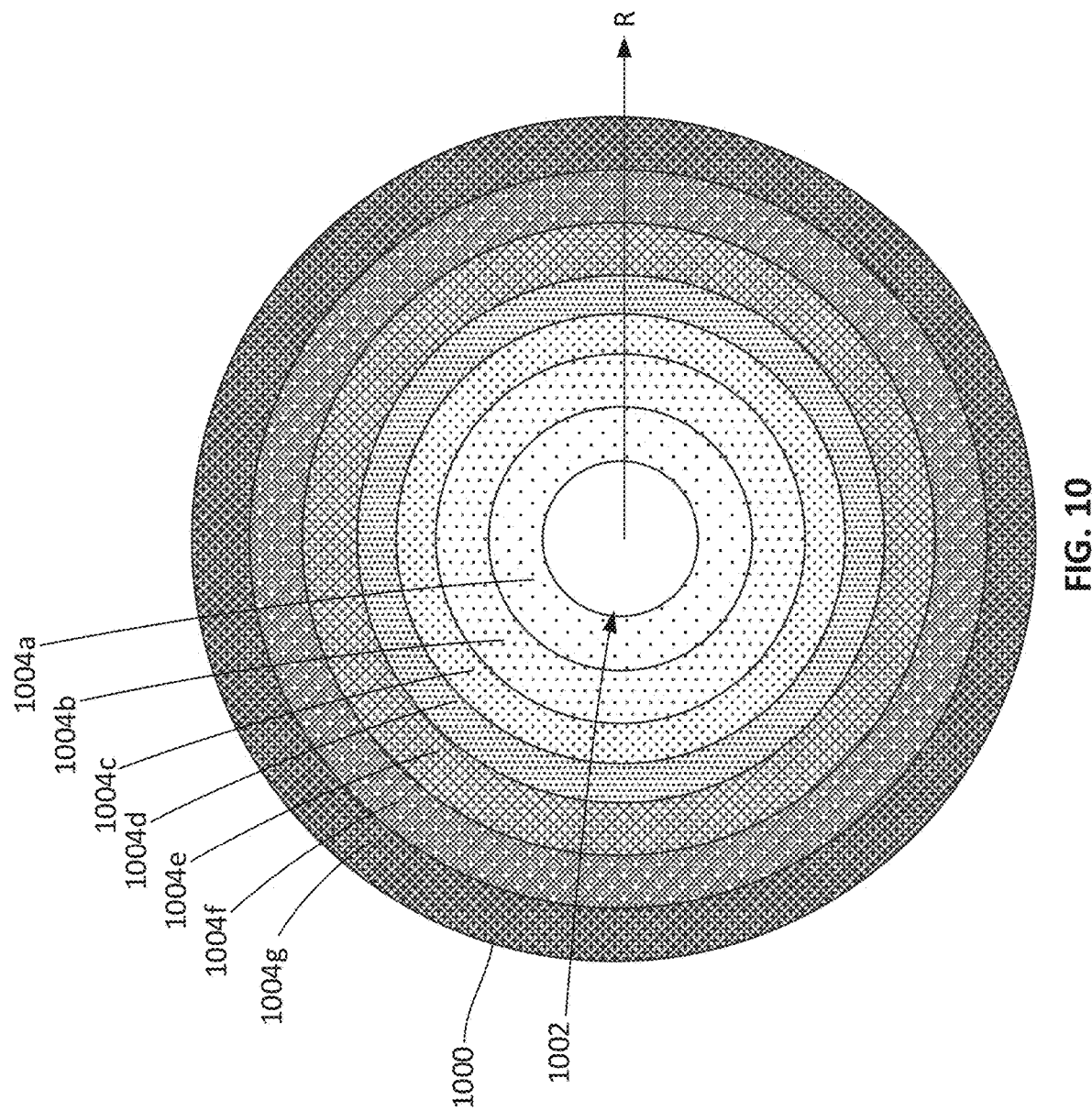
FIG. 10 is a top view of an example rotor that may be implemented in connection with the volumetric resistance blower of FIG. 1. The example rotor includes a plurality of sections of foam material having differing porosities.

FIG. 10 is a top view of an example rotor 1000 having varying porosities in the foam material. The example rotor 1000 can be implemented in connection with the VRB 100 of FIG. 1. For example, the example rotor 1000 can be used in place of the rotor 106. The rotor 1000 includes an opening 1002 to receive the motor 104 and the hub 108. In some examples, the example rotor 1000 is coupled directly to the hub 108. Alternatively, the rotor 1000 can be used with a carrier plate, such as one of the carrier plates 400, 600 disclosed herein. The example rotor 1000 may be constructed of a softer open-cell foam material, such a polyurethane-based foam material, or a more rigid foam material (e.g., a metal foam), such as nickel foam, similar to the rotor 700 disclosed in connection with FIG. 7.

The example rotor 1000 has a porosity that changes in the radial (R) direction. In the illustrated example, the rotor 1000 includes a plurality of sections 1004a-1004g of foam material. In this example, the sections 1004a-1004g are concentric rings. The sections 1004a-1004g have different degrees or densities of porosity. In FIG. 10 (as well as FIGS. 11 and 12), the sections of the rotor are shaded in different densities of stippling (dots) to indicate the varying degrees of porosity (e.g., lighter stippling in the inner diameter section 1004a indicating the least porous (i.e., most open) and darker stippling in the outer diameter section 1004g indicating the most porous (i.e., least open)). In the example of FIG. 10, the sections 1004a-1004g increase in porosity from the inner diameter section 1004a to the outer diameter section 1006g. In other words, the inner diameter section 1004a has the lower porosity (i.e., is the most open), which enables air to flow easily through the inner diameter section 1004a. As the air moves radially outward, the porosities of the subsequent sections 1004b-1004g increase. However, the centrifugal forces at these outer sections is higher, thereby providing sufficient force to push the air through the smaller cells in the radial direction. This design results in smoother, quieter air flow through the rotor 1000. In this example, the rotor 1000 includes seven sections 1004a-1004g. However, in other examples, the rotor 1000 may be constructed of more (e.g., 8, 9, etc.) or fewer (e.g., 6, 5, 4, 3, or 2) sections.

In the illustrated example, the thickness (in the radial direction) of each of the sections 1004a-1004g is about the same. However in other examples, one or more of the sections 1004a-1004g may have a different thickness than other ones of the sections 1004a-1004g. Further, while in the illustrated example each of the sections 1004a-1004g has a constant porosity throughout the respective section, in other examples, the rotor 1000 can be designed to have a gradually varying porosity that increases from the inner diameter toward the outer diameter. In other words, the foam material may not have discrete boundaries between two sections of different porosities. Instead, the porosity of the foam material may change gradually (e.g., linearly or non-linearly) from the inner diameter to the outer diameter.

Figure 11:
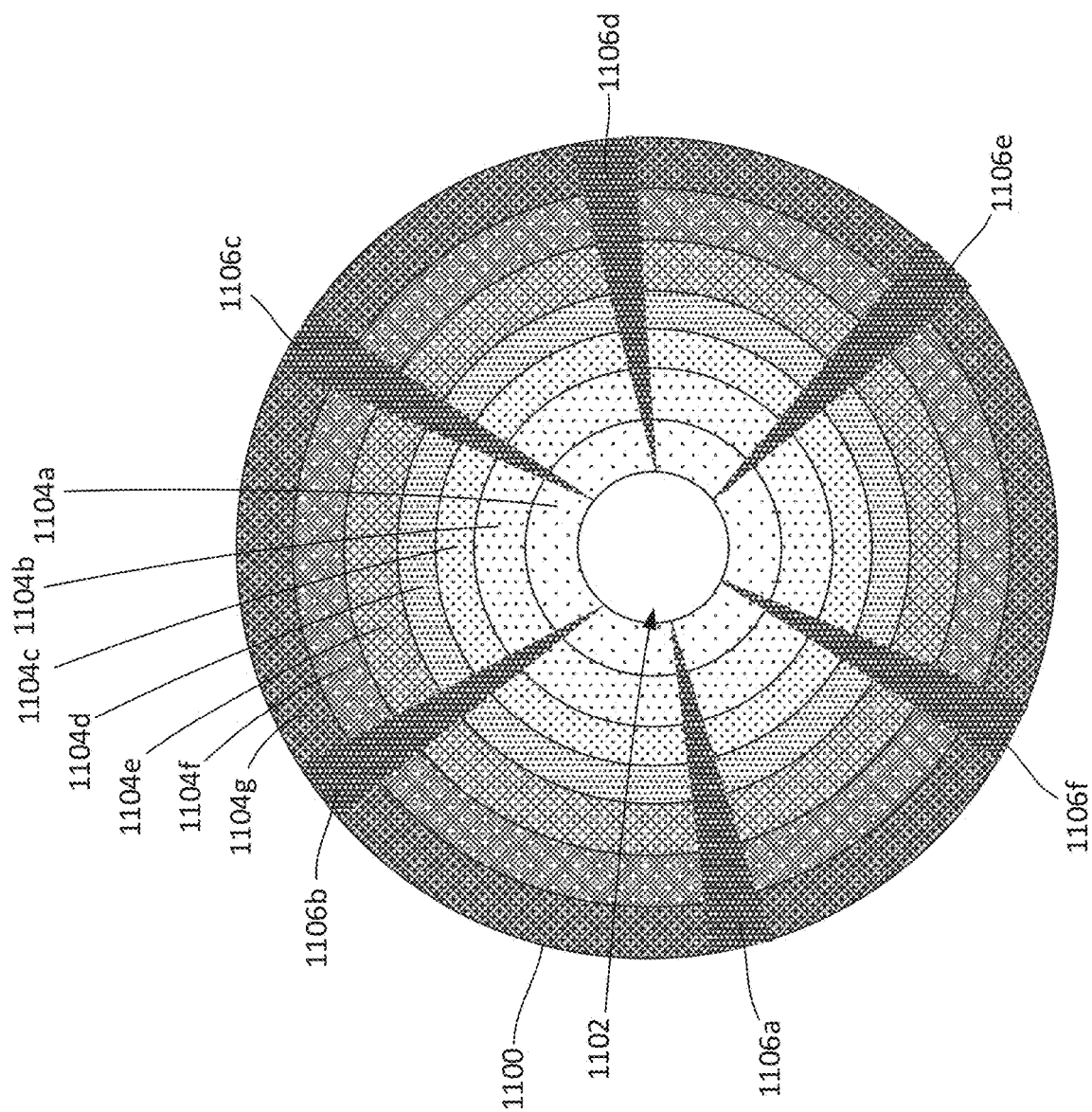
FIG. 11 is a top view of another example rotor that may be implemented in connection with the volumetric resistance blower of FIG. 1. The example rotor includes a plurality of sections of foam material having differing porosities and example guide sections.

In some examples, a rotor may include one or more guide sections and/or other types of obstructions to impede air flow in the angular direction, thereby aiding in directing the air flow radially. For example, FIG. 11 is a top view of another example rotor 1100 constructed of foam. The example rotor 1100 is similar to the rotor 1000 of FIG. 10 and includes an opening 1102 and a plurality of sections 1100a-1100g having different porosities that decrease from the inner diameter section 1104a to the outer diameter section 1104g. Similar to the rotor 1000, the rotor 1100 can be implemented in connection with the VRB 100 of FIG. 1, and may be constructed of a softer foam material (e.g., a polyurethane-based foam) or a more rigid foam material (e.g., a metal foam).

In this example, the rotor 1100 includes a plurality of guide sections 1106a-1106f that extend radially through the sections 1104a-1104g from the inner edge to the outer edge of the rotor 1100. The guide sections 1106a-1106f are formed of higher porosity foam material than the sections 1104a-1104g. As such, the guide sections 1106a-1106g resist or impede air flow in the angular or circular direction. Therefore, the air within each wedge or pie section between two of the guides sections 1106a-1106g is forced to move radially outward from the rotor 1100 as opposed to recirculating around the rotor 1100. In the illustrated example, the rotor 1100 includes six guide sections 1106a-1106f that are spaced equidistant around the rotor 1100. However, in other examples, the rotor 1100 may include more (e.g., 7, 8, etc.) or fewer (e.g., 5, 4, 3, 2, or 1) guide sections and the guide section(s) may be spaced evenly or unevenly.

While in the illustrated example of FIGS. 10 and 11 the porosity increases from the inner diameter to the outer diameter, in other examples, the arrangement may be reversed. For example, a rotor may be constructed of two or more sections of foam that decrease in porosity from the inner diameter to the outer diameter. The rotor may include two or more sections have distinct porosity or the rotor may be constructed of a foam that gradually changes (e.g., linearly or non-linearly) degree of porosity from the inner diameter to the outer diameter.

Figure 12:
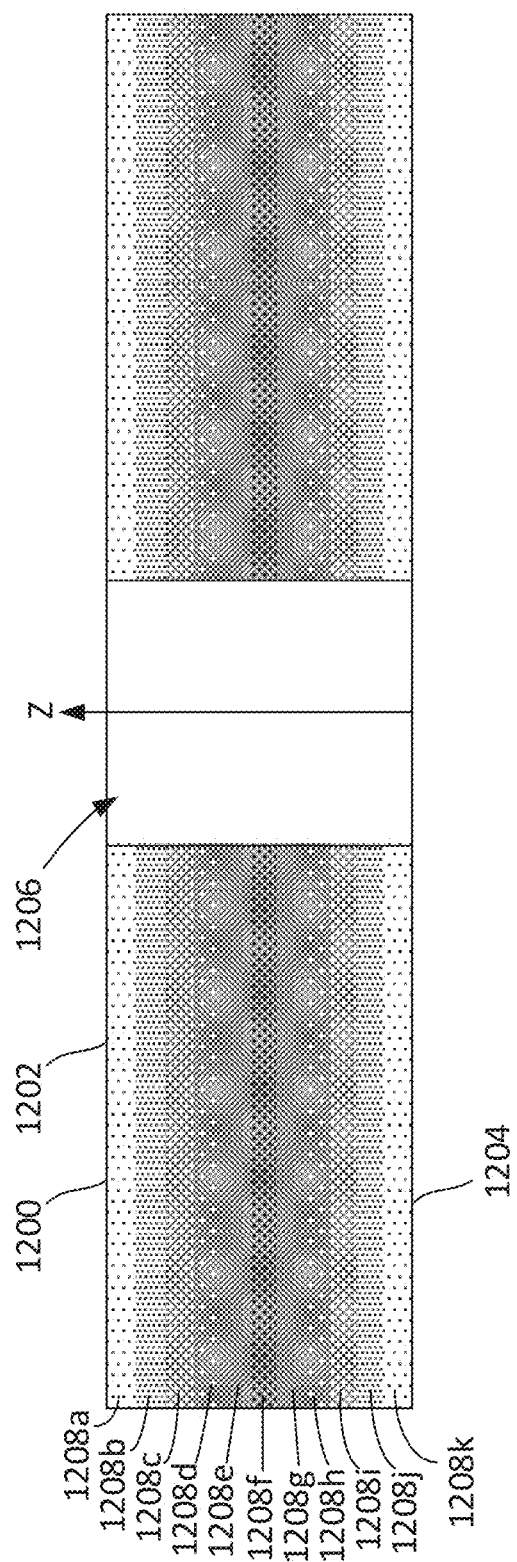
FIG. 12 is a cross-sectional view of another example rotor that may be implemented in connection with the volumetric resistance blower of FIG. 1. The example rotor includes a plurality of sections of foam material having differing porosities.

FIG. 12 is a cross-sectional view of another example rotor 1200 constructed of foam material. The rotor 1200 has a first side 1202 (e.g., a top side), a second side 1204 (e.g., a bottom side) opposite the first side 1202, and an opening 1206 extending between the first and second sides 1202, 1204 to receive a motor and/or hub. Similar to the rotors 1000, 1100 disclosed above, the rotor 1200 can be implemented in connection with the VRB 100 of FIG. 1, and may be constructed of a softer foam material (e.g., a polyurethane-based foam) or a more rigid foam material (e.g., metal foam).

The rotor 1200 has a porosity that changes in the axial (Z) direction (which is perpendicular to the radial (R) direction). In this example, the rotor 1200 is constructed of a plurality of sections 1208a-1208k of foam material that form stacks or layers in the axial (Z) direction (extending from the first side 1202 to the second side 1204). The sections 1208a-1208k vary in the degree of porosity. In particular, in this example, the sections 1208a-1208k decrease in porosity from the middle section 1208f, which is the most porous, to the top and bottom sections 1208a, 1208k (forming the first and second sides 1202, 1204), which are the least porous. This arrangement enables the air to flow more easily into the foam and, thus, helps increase overall flow rate.

In this example, the rotor 1200 includes eleven sections 1208a-1208k. However, in other examples, the rotor 120 may be constructed of more (e.g., 12, 13, 14, etc.) or fewer (e.g., 10, 9, 8, 7, 6, 5, 4, 3, or 2) sections. In the illustrated example, the thickness of each of the sections 1208a-1208k is about the same. However, in other examples, one or more of the sections 1208a-1208k may have a different thickness than other ones of the sections 1208a-1208k. Further, while in the illustrated example each of the sections 1208a-1208k has a constant porosity throughout the respective section, in other examples, the rotor 1200 can be constructed of a foam material having a gradually varying porosity that decreases from the middle area toward the first and second sides 1202, 1204. In other words, the material may not have discrete boundaries between two sections of different porosities. Instead, the porosity of the material may decrease gradually (e.g., linearly or non-linearly) from center to the first and second sides 1202, 1204. In other examples, instead of decreasing in porosity from the middle section to the top and bottom sections, a rotor may have increasing porosity from the middle section to the top and bottom sections.

In some examples, in addition to or as an alternative to the varying porosity design disclosed above, air flow impedance in a foam rotor can be achieved via specifically designed matrixes or structures in the foam material. For example, the foam material can be constructed to have specifically oriented and aligned cells that increase (e.g., maximize) air flow, as opposed to the amorphous (random) cellular structure of a typical foam. The amorphous nature of known foam materials, while effective, are not optimized for radial air flow. In particular, the random cellular structure increases air flow impedance as the random cell walls impede air flow and reduce momentum in the air flow. Therefore, example rotors can be designed with specifically oriented cells/matrix structures and features to increase air flow impedance as a function of radial location and to provide larger impedance in the angular direction relative to the radial direction. This resultant anisotropic airflow impedance optimizes air flow and blower efficiency. Example foam rotors with these specifically designed networks and features can be construed with micro additive manufacturing technology (e.g., 3D laser sintering, stereo lithography, etc.) rather than using standard foam materials.

Figure 13:
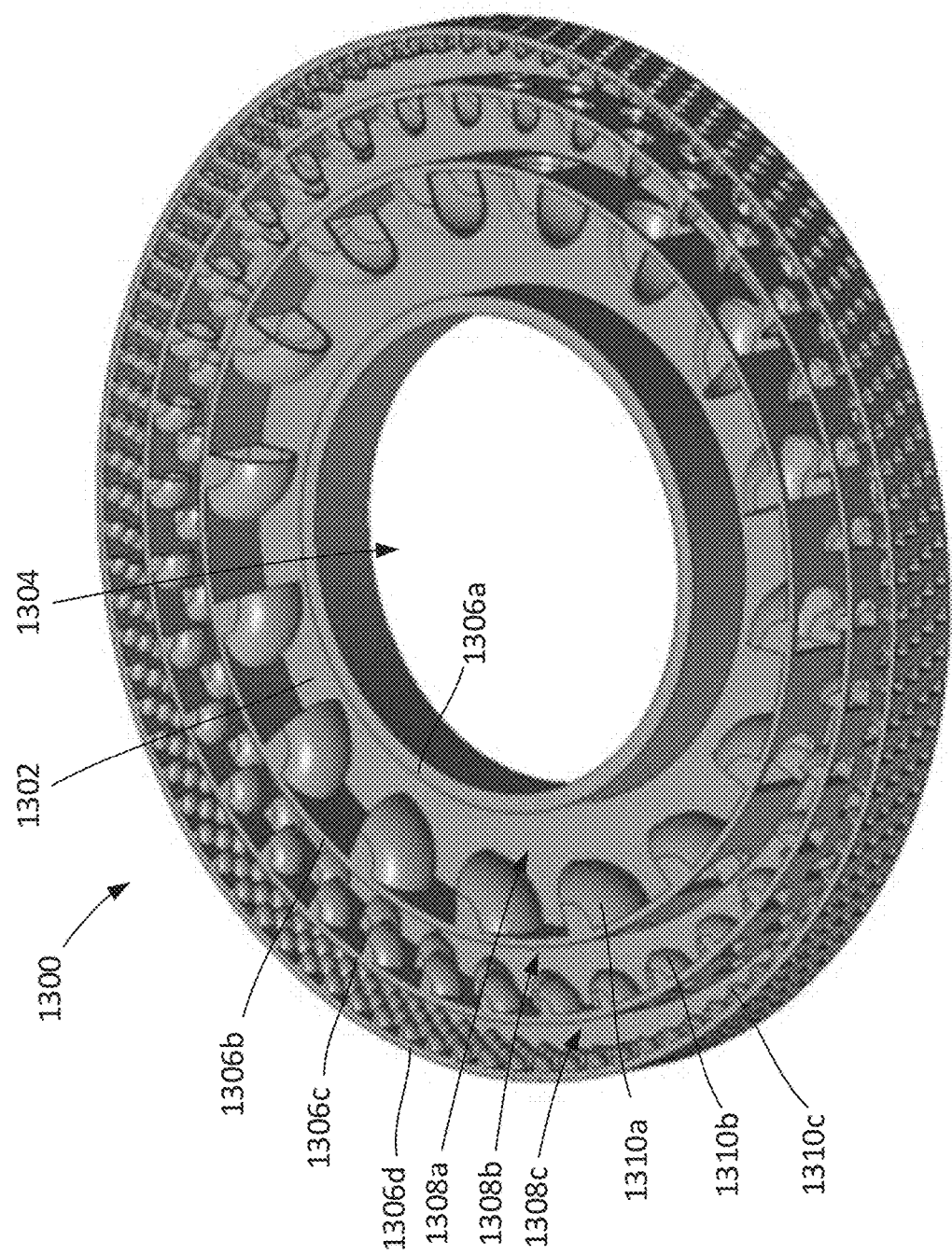
FIG. 13 illustrates another example rotor that may be implemented in connection with the volumetric resistance blower of FIG. 1.

For example, FIG. 13 illustrates an example rotor 1300 that may be used in a VRB. The rotor 1300 may be implemented in the VRB of FIG. 1. For example, the rotor 1300 can be used in place of the rotor 106. The rotor 1300 can be coupled to the hub 108 and rotated within the housing 102 to generate air flow.

In the illustrated example, the rotor 1300 includes a plate 1302 having an opening 1304 to receive the motor 104 and the hub 108. In the illustrated example, the rotor 1300 includes first, second, third, and fourth circular walls 1306a, 1306b, 1306c, 1306d extending from the plate 1302. The first, second, third, and fourth circular walls 1306a, 1306b, 1306c, 1306d are concentrically arranged and form areas or sections between the circular walls 1306a-1306d. For example, a first area 1308a is formed between the first and second circular walls 1306a, 1306b, a second area 1308b is formed between the second and third circular walls 1306b, 1306c, and a third area 1308c is formed between the third and fourth circular walls 1306c, 1306d. In the illustrated example, a first set of channels 1310a (one of which is referenced in FIG. 13) are coupled to the second circular wall 1306b to direct air through the second circular wall 1306b from the first area 1308a to the second area 1308b. A second set of channels 1310b (one of which is referenced in FIG. 13) are coupled to the third circular wall 1306c to direct air through the third circular wall 1306c from the second area 1308b to the third area 1308c. A third set of channels 1310c (one of which is referenced in FIG. 13) are coupled to the fourth circular wall 1306d to direct air through the fourth circular wall 1306d and radially outward from the rotor 1300. In the illustrated example, the first, second, and third sets of channels 1310a, 1310b, 1310c form substantially 90° turns or bends that direct air from a circumferential direction to a substantially radial direction. This helps enable the air to flow more smooth and directly from the inner diameter toward the outer diameter of the rotor 1300. For example, as the rotor 1300 is rotated, air in the first area 1308a is captured by the first set of channels 1310a and directed radially outward through the second circular wall 1306b into the second area 1308b; air in the second area 1308b is captured by the second set of channels 1310b and directed radially outward through the third circular wall 1306c into the third area 1308c; and air in the third area 1308c is captured by the third set of channels 1310c and directed radially outward through the fourth circular wall 1306d out into the surrounding environment (e.g., which is ejected outward through the outlet 112 of the VRB 100). In some examples, the rotor 1300 is constructed of a relatively rigid material, such as plastic. In other examples, the rotor 1300 can be constructed of another material.

In the illustrated example, the first set of channels 1310a have a larger diameter than the second set of channels 1310b, and the second set of channels 1310b have a larger diameter than the third set of channels 1310c. Thus, the diameters of the channels decrease from the inner diameter to the outer diameter. At the outer diameter sections, the centripetal acceleration is larger compared to the inner diameter sections, which drives more flow through the smaller third set of channels 1310c. Near the center, where the centripetal acceleration is lower, the larger first set of channels 1310a are used to ease the flow into the rotor 1300.

While in the illustrated example the rotor 1300 is divided into the three areas 1308a-1308c, in other examples, the rotor 1300 can include more or fewer circular walls to define the rotor 1300 into more (e.g., 4, 5, etc.) or fewer (e.g., 2) sections.

Figure 14:
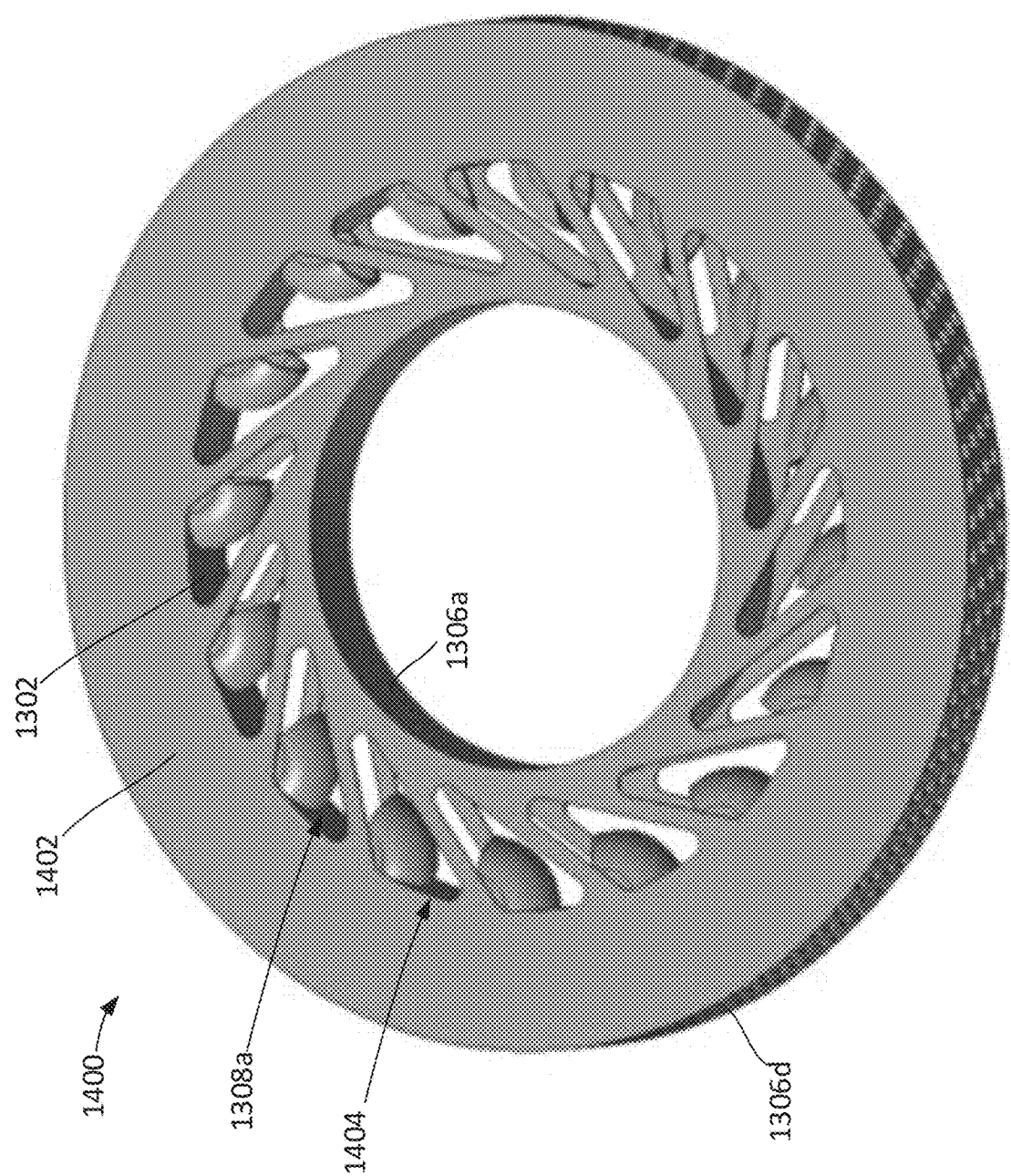
FIG. 14 illustrates another example rotor that may be implemented in connection with the volumetric resistance blower of FIG. 1.

In the illustrated example, the plate 1302 forms one side of the rotor 1300 (e.g., a bottom side), whereas an opposite side (e.g., a top side) remains open to draw in air (e.g., via the inlet 110 of the housing 102 (FIG. 1)). In other examples, another plate may be used on the top side. For example, FIG. 14 illustrates another example rotor 1400 that may be used in a VRB, such as the VRB 100 of FIG. 1. The rotor 1400 is similar to the rotor 1300 of FIG. 13 and includes substantially the same elements. Thus, the same element numbers and names are used in connection with FIG. 14. However, in this example, the rotor 1400 includes a second plate 1402 that forms a top side of the rotor 1400, opposite the first plate 1302. The circular walls 1306a-1306d and the areas 1308a-1308c are disposed between the plates 1302, 1402. To allow air into the first area 1308a, the first and second plates 1302, 1402 include a plurality of openings 1404 (one of which is reference in FIG. 14). Similar to the rotor 1300, as the rotor 1400 is rotated, air is moved (via centrifugal force) through each of the areas 1308a-1308c and outward from the fourth circular wall 1306d.

An example method includes using any of the example volumetric resistance blowers and/or rotors disclosed herein. Any of the example volumetric resistance blowers and/or rotors can be used in a computing device (e.g., a laptop computer, a desktop computer, etc.) having one or more heat generating devices, for example.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

From the foregoing, it will be appreciated that improvements to rotors for volumetric resistance blowers have been disclosed herein. The examples disclosed herein improve volumetric resistance blowers by enhancing manufacturability options and increasing air flow for a given volumetric disc size and at ISO acoustic levels. The increased air flow per unit volume leads to improved cooling performance and/or reduced blower size, which frees up space for other system components within a computer device.

Further examples and combinations thereof include the following:

Example 1 includes a volumetric resistance blower including a housing, a motor, and a rotor disposed within the housing and rotated by the motor. The rotor is constructed of metal foam.

Example 2 includes the volumetric resistance blower of Example 1, wherein the rotor is constructed of nickel foam.

Example 3 includes the volumetric resistance blower of Examples 1 or 2, wherein the rotor is cylindrical or disc-shaped.

Example 4 includes the volumetric resistance blower of any of Examples 1-3, further including a hub. The hub is coupled to and driven by the motor, and the rotor is coupled to the hub.

Example 5 includes the volumetric resistance blower of Example 4, wherein the rotor is coupled to the hub via press fit.

Example 6 includes the volumetric resistance blower of any of claims 1-5, wherein the rotor has a plurality of sections having differing porosities.

Example 7 includes the volumetric resistance blower of Example 6, wherein the sections are concentric rings, and the concentric rings increase in porosity from an inner diameter section to an outer diameter section.

Example 8 includes the volumetric resistance blower of claim 7, wherein the rotor includes a plurality of guide sections extending radially through the concentric rings. The guide sections are constructed of foam material having a higher porosity than the concentric rings.

Example 9 includes the volumetric resistance blower of Example 6, wherein the sections are stacked in an axial direction.

Example 10 includes the volumetric resistance blower of Example 9, wherein the sections decrease in porosity from a middle section to top and bottom sections.

Example 11 includes the volumetric resistance blower of any of Examples 1-10, wherein the housing has an inlet and an outlet.

Example 12 includes a method including using the volumetric resistance blower of any of Examples 1-11.

Example 13 includes a rotor to be used in a volumetric resistance blower. The rotor is constructed of a block of metal foam in the shape of a cylinder or disc.

Example 14 includes the rotor of Example 13, wherein the metal foam is nickel foam.

Example 15 includes a volumetric resistance blower including a motor, a carrier plate driven by the motor, the carrier plate including a plurality of posts, and a rotor coupled to the carrier plate via the posts, the rotor constructed of foam material.

Example 16 includes the volumetric resistance blower of Example 15, wherein the rotor includes a plurality of openings, and the posts extend into corresponding ones of the openings to couple the rotor to the carrier plate.

Example 17 includes the volumetric resistance blower of Example 16, wherein the openings are smaller than the respective posts, such that the foam material expands onto the posts.

Example 18 includes the volumetric resistance blower of any of Examples 15-17, further including a hub. The hub is coupled to and driven by the motor, and the carrier plate is coupled to the hub.

Example 19 includes the volumetric resistance blower of Example 18, wherein the carrier plate includes an opening, and the hub and the motor are disposed in the opening.

Example 20 includes the volumetric resistance blower of Examples 18 or 19, wherein the carrier plate is co-molded with the hub.

Example 21 includes the volumetric resistance blower of any of Examples 18-20, wherein the rotor is not coupled to the carrier plate or the hub with an adhesive.

Example 22 includes the volumetric resistance blower of any of Examples 15-21, further including a housing having an inlet and an outlet. The rotor is disposed within the housing.

Example 23 includes the volumetric resistance blower of any of Examples 15-22, wherein the carrier plate is circular.

Example 24 includes a volumetric resistance blower including a motor and a rotor coupled to be rotated by the motor. The rotor is constructed of a plurality of sections of foam material having differing porosities.

Example 25 includes the volumetric resistance blower of Example 24, wherein the sections are concentric rings, and the concentric rings increase in porosity from an inner diameter section to an outer diameter section.

Example 26 includes the volumetric resistance blower of claim 25, wherein the rotor includes a plurality of guide sections extending radially through the concentric rings. The guide sections are constructed of foam material having a higher porosity than the concentric rings.

Example 27 includes the volumetric resistance blower of Example 24, wherein the sections are stacked in an axial direction.

Example 28 includes the volumetric resistance blower of Example 27, wherein the sections decrease in porosity from a middle section to top and bottom sections.

Example 29 includes the volumetric resistance blower of any of Examples 24-28, further including a housing having an inlet and an outlet. The rotor is disposed in the housing.

Example 30 includes a method of using the volumetric resistance blower of any of Examples 24-29.

Example 31 includes a rotor to be used in a volumetric resistance blower. The rotor is constructed of a plurality of sections of foam material having differing porosities.

Example 32 includes a computing device including one or more heat generating devices, and the volumetric resistance blower or the rotor of any of Examples 1-31 above.

Although certain example apparatus and articles of manufacture have been disclosed herein, the scope of coverage of this patent is not limited thereto. On the contrary, this patent covers all apparatus and articles of manufacture fairly falling within the scope of the claims of this patent.

What is claimed is:
1. An electronic device comprising:
an enclosure;
processor circuitry carried by the enclosure; and
a blower to dissipate heat from the enclosure, the blower including:

a carrier plate having a first side and a second side opposite the first side;
a motor to drive the carrier plate;
a post carried by the carrier plate; and
a rotor carried by the carrier plate, the rotor including foam material, the rotor defining an opening to receive the post to couple the rotor to the carrier plate.

2. The electronic device of claim 1, wherein the opening has an area that is smaller than a cross-sectional area of the post, such that the foam material contacts the post.

3. The electronic device of claim 1, wherein the post has a tear-drop shaped cross-section.

4. The electronic device of claim 1, wherein the carrier plate defines a first central opening and the rotor defines a second central opening, the motor at least partially in the first and second central openings.

5. The electronic device of claim 4, wherein the blower includes a hub to be driven by the motor, an inner peripheral edge of the carrier plate coupled to the hub.

6. The electronic device of claim 1, wherein the rotor is at least one of cylindrical or disc-shaped.

7. The electronic device of claim 1, further including additional posts carried by the carrier plate, the rotor defining additional openings to receive corresponding ones of the additional posts to couple the rotor to the carrier plate.

8. The electronic device of claim 7, wherein the additional posts are spaced equidistant from each other.

9. The electronic device of claim 7, wherein the additional posts include a first set of posts a first distance from a center of the carrier plate and a second set of posts a second distance from the center of the carrier plate, the first distance greater than the second distance.

10. The electronic device of claim 7, wherein the carrier plate defines vent openings, respective ones of the vent openings between adjacent ones of the additional posts.

11. The electronic device of claim 1, wherein the rotor is not coupled to the carrier plate with an adhesive.

12. The electronic device of claim 1, wherein the electronic device comprises at least one of a laptop computer, a desktop computer, a server, a tablet computer, a multimedia player, a server, or a smart phone.

13. An electronic device comprising:
an enclosure;
means for generating heat, the heat generating means in the enclosure; and
a blower at least partially in the enclosure to reduce a temperature inside the enclosure, the blower including:
a housing;
a rotor in the housing, the rotor having a first porosity that decreases in a first axial direction from an intermediate region to a top side of the rotor, the rotor having a second porosity that decreases in a second axial direction opposite the first axial direction from the intermediate region to a bottom side of the rotor; and
a motor to drive the rotor.

14. The electronic device of claim 13, wherein the rotor includes a plurality of stacked sections.

15. The electronic device of claim 14, wherein each of the stacked sections has a same size thickness.

16. The electronic device of claim 13, wherein the rotor includes metal foam.

17. The electronic device of claim 16, wherein the blower includes a hub, the hub coupled to the motor, the hub to be driven by the motor, the rotor coupled to the hub via press fit.

18. The electronic device of claim 16, wherein the blower includes a hub, the hub coupled to the motor, the hub to be driven by the motor, the rotor soldered or welded to the hub.

19. The electronic device of claim 16, wherein the metal foam is nickel foam.

20. The electronic device of claim 13, wherein the electronic device comprises at least one of a laptop computer, a desktop computer, a server, a tablet computer, a multimedia player, a server, or a smart phone.

* * * * *